United States Patent
Van Erven

(10) Patent No.: US 7,257,088 B2
(45) Date of Patent: Aug. 14, 2007

(54) SDMA SYSTEM USING MU-SIMO FOR THE UPLINK AND MU-MISO FOR THE DOWNLINK

(75) Inventor: Niels Van Erven, Santa Clara, CA (US)

(73) Assignee: 3Com Corporation, Marlborough, MA (US)

(*) Notice: Subject to any disclaimer, the term of this patent is extended or adjusted under 35 U.S.C. 154(b) by 645 days.

(21) Appl. No.: 10/843,218

(22) Filed: May 11, 2004

(65) Prior Publication Data
US 2005/0254437 A1   Nov. 17, 2005

(51) Int. Cl.
*H04Q 7/00* (2006.01)
(52) U.S. Cl. ............... 370/252; 370/329; 370/341
(58) Field of Classification Search ............ None
See application file for complete search history.

(56) References Cited

U.S. PATENT DOCUMENTS

| | | | | |
|---|---|---|---|---|
| 5,642,353 | A * | 6/1997 | Roy et al. | 370/329 |
| 5,909,649 | A | 6/1999 | Saunders | |
| 6,041,237 | A | 3/2000 | Farsakh | |
| 6,240,098 | B1 * | 5/2001 | Thibault et al. | 370/431 |
| 6,377,819 | B1 * | 4/2002 | Gesbert et al. | 455/562.1 |
| 6,865,377 | B1 * | 3/2005 | Lindskog et al. | 455/101 |
| 6,870,808 | B1 * | 3/2005 | Liu et al. | 370/203 |
| 6,965,774 | B1 * | 11/2005 | Kasapi et al. | 455/450 |
| 2002/0114269 | A1 | 8/2002 | Onggosanusi et al. | |

FOREIGN PATENT DOCUMENTS

WO   WO 03/069816 A2   8/2003

OTHER PUBLICATIONS

Bolcskei et al., "On the Capacity of OFDM-Based Spatial Multiplexing Systems", IEEE Transactions on Communications, vol. 50, No. 2, Feb. 2002, pp. 225-234.
Bonek et al., "Smart Antennas for Mobile Communication Systems", Project Report, Dec. 18, 1998, Technische Universitat Wien, Institut fur Nachrichtentechnik und Hochfrequenztechnik, 21 pages.
Gore et al., "MIMO Antenna Subset Selection With Space-Time Coding," IEEE Transactions on Signal Processing, vol. 50, No. 10, Oct. 2002, pp. 2580-2588.
Laurila et al., "Semi-Blind Signal Estimation for Smart Antennas Using Subspace Tracking", IEEE Catalog No. 99EX304, , 5 pages, 2d IEEE Signal Processing Workshop on Signal Processing Advances in Wireless Communications, May 9-12, 1999, Annapolis, MD.

(Continued)

*Primary Examiner*—Chi Pham
*Assistant Examiner*—Soon D. Hyun
(74) *Attorney, Agent, or Firm*—McDonnell Boehnen Hulbert & Berghoff LLP

(57) ABSTRACT

The present invention relates to multiple antenna wireless access points that multiplex signals by spatial division. In particular, it relates to grouping clients of the access point for spatial division multiplexing. Particular aspects of the present invention are described in the claims, specification and drawings.

31 Claims, 3 Drawing Sheets

OTHER PUBLICATIONS

Nabar et al., "Cut-Off Rate Based Transmit Optimization for Spatial Multiplexing on General MIMO Channels", Communication Technology Laboratory ETH Zurich and Information Systems Laboratory, Stanford University, CA, ICASSP 2003, pp. V-61-V64.

Paulraj et al., Space-Time Modems for Wireless Personal Communications, IEEE Personal Communications, Feb. 1998, pp. 36-48.

Ponnekanti, "An Overview of Smart Antenna Technology for Heterogeneous Networks", IEEE Communications Surveys, 4th Quarter 1999, vol. 2, No. 4, pp. 14-23.

Sandhu et al., "Introduction to Space-Time Codes", 33 pages, (2003).

Stevanovic et al., "Smart Antenna Systems for Mobile Communications," Final Report, Jan. 2003, Ecole Polytechnique Federale de Lausanne, Lausanne, Switzerland, 110 pages.

Thoen et al., "Constrained Least Squares Detector for OFDM/SDMA-Based Wireless Networks", Interuniversity Micro Electronics Center, Heverlee, Belgium, IEEE 2001, pp. 866-870.

Utschick et al., "Comparison of Two DOA Tracking Implementations for SDMA", Lehrstuhl fur Netzwerktheorie und Signalverarbeitung Technische Universitat, Munich, Germany, 5 pages, (2003).

Will, "Introduction to the Singular Value Decomposition", (c) 1999, printed Jan. 21, 2004 at www.uwlax.edu/faculty/will/svd/index.html, 112 pages.

International Search Report for PCT/US2005/16498 dated Jun. 14, 2006.

* cited by examiner

SDMA SYSTEM USING MU-SIMO FOR THE UPLINK AND MU-MISO FOR THE DOWNLINK

BACKGROUND OF THE INVENTION

The present invention relates to multiple antenna wireless access points that multiplex signals by spatial division. In particular, it relates to grouping clients of the access point for spatial division multiplexing.

Wireless LAN (WLAN) access points are a popular product category. As the number of clients that desire service from an access point increases, one strategy for increasing the number of clients served is spatial division multiplexing (SDMA). Spatial diversity involves the use of multiple antennas sufficiently well-separated at the receiver and/or the transmitter that the individual transmission paths experience effectively independent fading. Juha Heiskala and John Terry, OFDM Wireless LANs: A theoretical and Practical Guide 2002 p. 131. Some theoretical investigation has been directed to the effectiveness of spatial multiplexing, such as Helmut Bölcskei et al., "On the Capacity of OFDM-Based Spatial Multiplexing Systems", IEEE Transactions on Comm., Vol. 50, No. 2 February 2002; Helmut Bölcskei et al., "Space-Frequency Coded MIMO-OFDM with Variable Multiplexing-Diversity Tradeoff", IEEE 2003; and Arogyaswami J. Paulraj and Boon Chong Ng, "Space-Time Modems for Wireless Personal Communications", IEEE Personal Communications• February 1998. A survey of smart antenna literature has been prepared by Seshaiah Ponnekanti, "An Overview Of Smart Antenna Technology For Heterogeneous Networks", IEEE Communications Surveys, Vol. 2 no. 4, http://www.comsoc.org/pubs/surveys Fourth Quarter 1999, pp. 14 et seq.

Work on use of multiple antennas to improve wireless communications has included studies of selecting antenna subsets, utilizing a partial MIMO instead of a full MIMO. Dhananjay A. Gore and Arogyaswami J. Paulraj, "MIMO Antenna Subset Selection With Space-Time Coding", IEEE Transactions On Signal Processing, Vol. 50, No. 10, October 2002; and A. Gorokhov, D. Gore and A. Paulraj, "Performance Bounds for Antenna Selection in MIMO Systems", IEEE 2003. Use of a subset, instead of the whole set of available antennas, sacrifices antenna diversity for reduced computation and signal translation.

In general, an access point that processes signals from "m" antennas can simultaneously service m−1 clients by spatial division of signals. Theoretically, solving a linear system of differences among reception of signals at m antennas can resolve m−1 sources. The problem is more difficult than just resolving the m−1 sources, because an additional number of interference sources or interferers need to be rejected and noise needs to be filtered out.

Given the opportunity to extend the functionality of radio wireless access points by using multiple antennas and spatial division multiplexing, an opportunity arises for methods and devices that improve the performance of SDMA had a modest cost.

SUMMARY OF THE INVENTION

The present invention relates to multiple antenna wireless access points that multiplex signals by spatial division. In particular, it relates to grouping clients of the access point for spatial division multiplexing. Particular aspects of the present invention are described in the claims, specification and drawings.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

One application of SDMA to a multi-user wireless system such as a WLAN is to communicate with two or more clients using the same frequency and transmission time, whether the frequency and time are determined by TDMA, CDMA or other allocation strategy. Reusing a channel (communicating on the same frequency band and time instance) is possible when there is sufficient spatial separation between the clients and the base station antennas.

Figure 1:
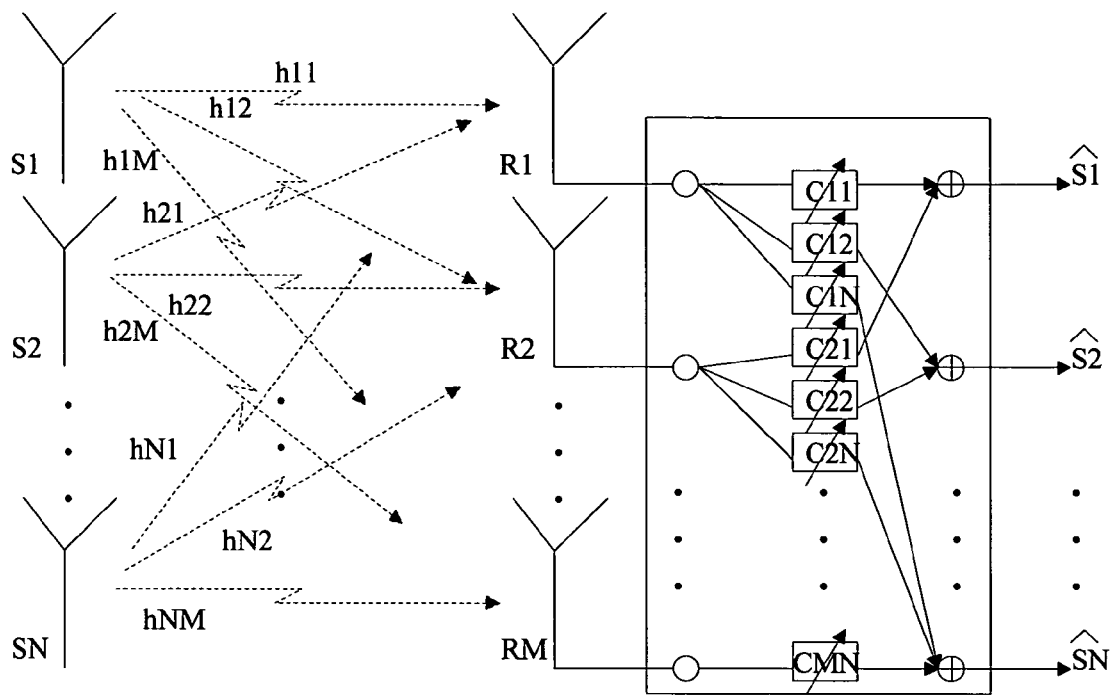
FIG. 1 illustrates a multiple input multiple output (MIMO) network of signals and receiving antennas.

To reuse channels, application of a MU-SIMO strategy for the uplink and a MU-MISO strategy for the downlink is proposed. MU-SIMO refers to multiple user, single input (at the mobile unit) multiple output (at the base station.) Multiple output corresponds to multiple antennas. Similarly, MU-MISO refers to multiple user, multiple input (at the base station) single output (at the mobile unit.) In FIG. 1, the antennas on the left, S1 to SN, can be taken as single antenna on N mobile units. These antennas radiate signals across paths h11 to hNM, which reach M receiving antennas. A matrix of at least N by M coefficients, C11 to CMN operate on the signals received at the antenna to produce combined signals S1-hat through SN-hat. In practice, it may be necessary to segregate more sources than actual signals, because interferers may be present. While only N transmitting antenna are depicted in the diagram, it is not unlikely that one, two or more interferers also will be present, so there may be S(N+2)-hat outputs from applying the coefficients. The coefficients typically will be complex, representing both phase and gain corrections.

As indicated above, a system with n+1 antennas can provide spatial separation, client position permitting, among n clients (counting significant sources of interference as clients). Using multiple combinations of frequencies and time slots, the system may have the potential of servicing a multiple of n clients. Using spatial resolution to service this many clients requires grouping the clients into sets of well-resolved clients.

Figure 2:
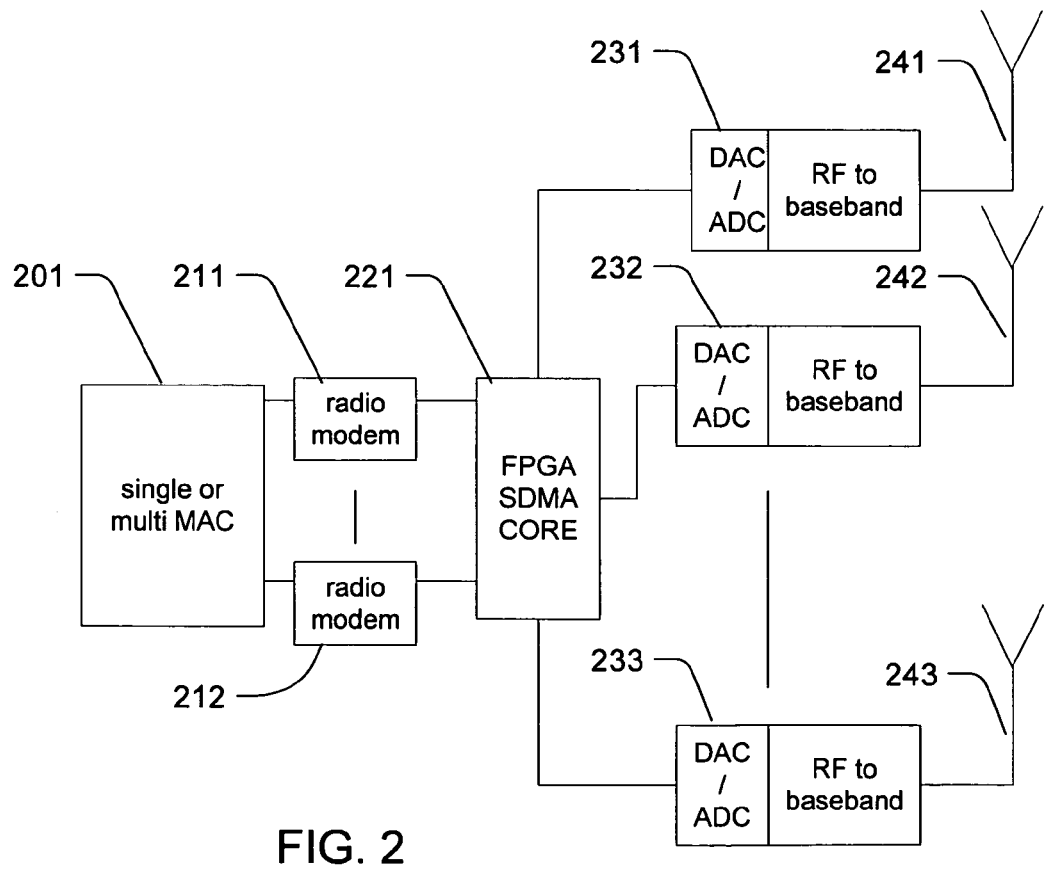
FIG. 2 is a block diagram of a spatial division multiplexing access point.

In this application, m+1 antennas are supported by m+1 receiver sections, as illustrated in FIG. 2. A single or multiple MAC 201 is connected to a plurality of radio modems 211–212. A spatial division multiplexing core 221 may be implemented in silicon or as a fully programmable gate array, a semi-custom signal processor or a program loaded onto a programmable signal processor. The SDMA core 221 is coupled to the radio modems on one side 211-212 and through transmit/receive sections 231-233 to antenna 241-243 on the other side. The transmit/receive sections may include digital to analog converters, analog digital converters, RF to baseband encoders and baseband to RF decoders.

Figure 5:
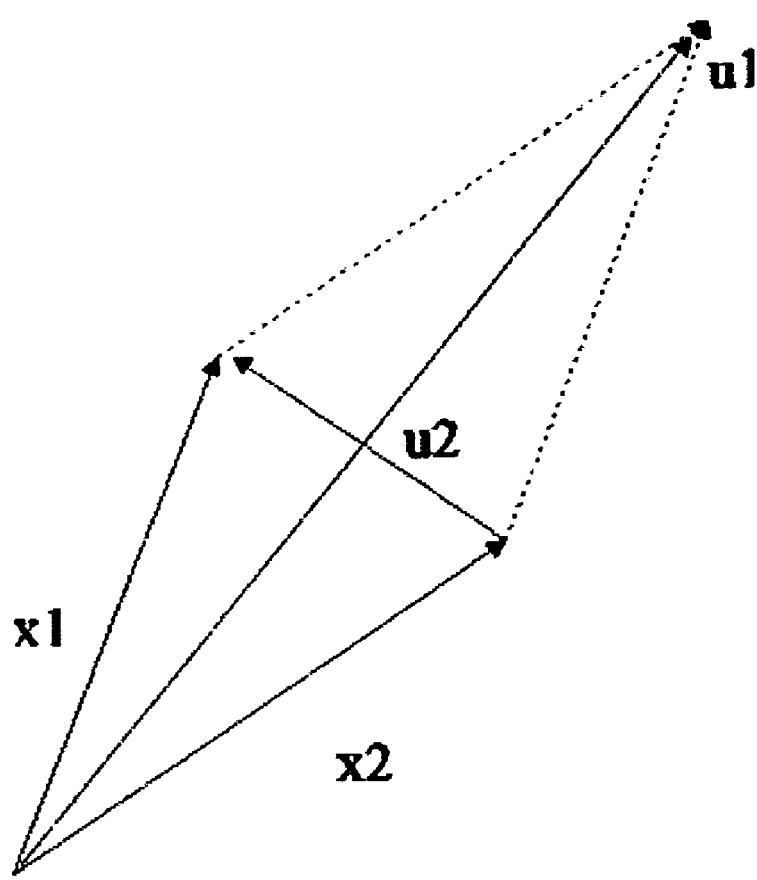
FIG. 5 is a visualization of a singular value resulting from singular value decomposition.

FIG. 5 is a two-client, two-dimensional illustration of separation and spatial resolution. In this figure, the clients correspond to x1 and x2. The length of the vectors for these two clients generally corresponds to the strength of the received signal. The angle between the two vectors corresponds to their spatial separation. One way to think of spatial resolution (ignoring phase separation, which changes as a source moves) is to add the vectors together to produce the first resulting vector u1, and to construct a second resulting vector u2, perpendicular the first resulting vector, as a measure of spatial resolution. The better the spatial separation, the longer the second resulting vector will be, compared to the first resulting vector. When the ratio of u1/u2 is large, an SVD coefficient matrix may be ill-conditioned. When the ratio approaches 1, this indicate that the signal source extraction process (in this case with SVD) is less susceptible to overall system noise.

Figure 4:
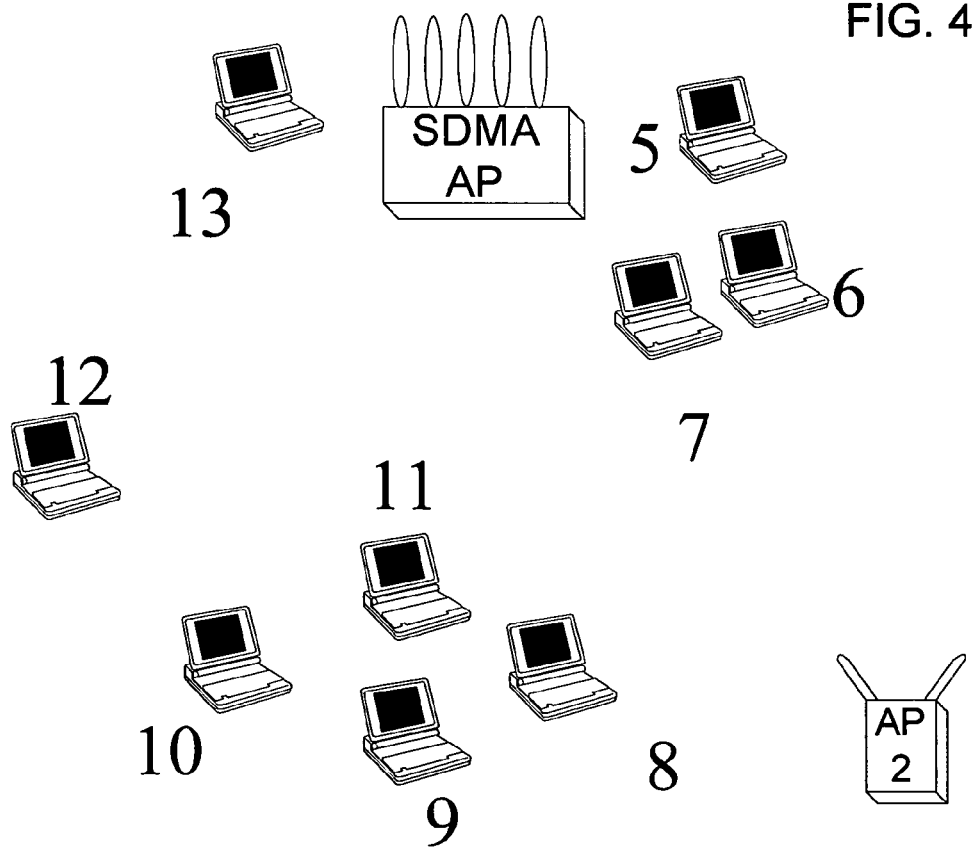
FIG. 4 illustrates a five-antenna spatial division access point, serving 13 clients in various locations and resolving an additional access point that produces one or more interference sources.

FIG. 4 illustrates positioning of clients around an access point. Clients 1-13 and a source of interference, AP 2 are positioned at various radii and polar orientations to the access point "SDMA AP". In this figure, there is little angular separation between clients 9 and 11. Similarly, there is little angular separation between client 7 and source of interference AP 2. While the angular separation is small, spatial separation depends on both angle and distance. In general, when the spatial separation is small among several sources, it is difficult to extract the signals of these sources. This can be explained with an example. When the angular separation is small and the distance of the two sources causes phase alignment of the signals, it may be difficult to achieve spatial separation. Similarly, when the angular separation is small and either of the sources is moving, the channel will fade when phases align. FIG. 4 illustrates only five antennas, so at least four sets of four clients need to be formed. Various strategies can be employed to choose said members. Each set is limited to four members, because there are five antennas.

A preliminary choice of set members can be based on a signal quality indicator (SQI) or a received signal strength indicator (RSSI). Receivers typically identify the sources within range, using basic receiver functionality, during DCF or PCF coordination. Various hardware and/or software layers count the number of sources and provide one or more SQI/RSSI parameters for each source. For preliminary choice of set members, group the signals using the SQI/RSSI information, so that strong sources are grouped together and weak sources are grouped together. For example, if the SQI values are 10, 9, 8, 8, 7, 6, 2, 1, 1, 1, 0.5, one or more sets may be formed for the SQI values in the range of 10 to 6. If two sets are formed, for instance, one set may be filled first and the left over sources assigned to the second set. The first set can be less than completely filled. Or, the sources can be divided evenly among the two sets. The sources preferably are divided by strength, but could be assigned more arbitrarily, subject to reassignment. The preliminary choice of set members is subject to reassignment, so a variety of preliminary assignment schemes may be used. Continuing the example, one or more additional sets are formed in the range of 2 to 0.5, so that all of the clients are accounted for. Grouping sources by signal quality or strength reduces variation among members in the set and thereby increases the effective resolution across the dynamic range of the set. It does not demonstrate whether good spatial resolution can be achieved.

Given a preliminary choice of set membership, sets are analyzed for adequacy of spatial separation among set members. Forming sets reduces the computing power required to analyze spatial separation, because fewer comparisons are required to sort among members of a smaller set. This is true for application of singular value decomposition or cross-correlation. It is less true if source signals are characterized and all that needs to be compared is source characterizations. And, as processor power continues to increase, it may become practical to analyze all sources for spatial resolution before making a preliminary choice of set members.

One method for testing the preliminary choice of set membership is to sample the set members and perform a singular value decomposition (SVD). Application of SVD is discussed in the patent literature, in the context of coherently combining signals, such as subchannels of a wideband spacetime multipath channel (See US 2002/0114269 A1) or with mutually spaced antenna at the transmit and receive ends. See WO 03/069816. Use of SVD to assist in choosing or to verify choice of set members for signal reuse is new.

Figure 3:
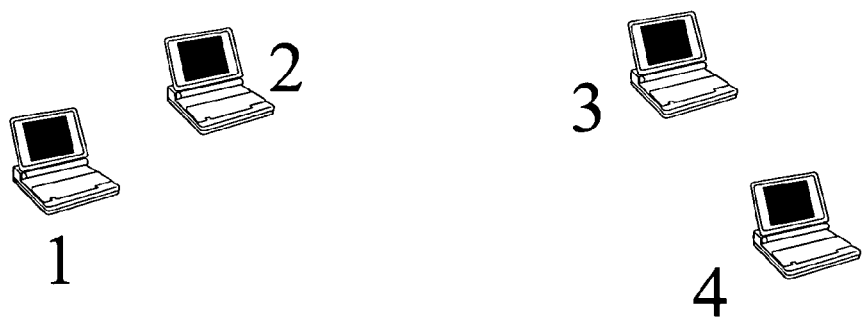
FIG. 3 depicts a reduced singular value decomposition matrix, with equal numbers of rows and columns.

A readable description of SVD, "Introduction to Singular Value Decomposition", by Todd Will, is currently available at www.uwlax.edu/faculty/will/svd/index.html. From the tutorial or from an understanding of SVD, one will understand that SVD is typically applied by over-sampling the M received signals in a time slot assigned to the particular set. The samples, which may be represented as complex values, become rows in an SVD matrix. One of the virtues of SVD analysis is that redundant rows reduce the vulnerability of the analysis to sampling or computation errors. The result of an SVD is expressed as three matrices, which Will calls the hanger, stretcher and aligner matrices. In more conventional notation, the three matrices may be $U\Sigma V^T$ or $UDV^H$. The stretcher matrix, $\Sigma$ or D is diagonal matrix, illustrated by FIG. 3. The singular values may be labeled $\sigma_{11}$, $\sigma_{22}$, through $\sigma_{MM}$. Many methods have been proposed for numerical derivation of the singular values. The application described herein does not depend on the computation method.

When SVD is performed, it is useful to select the number of columns and rows in a way that does not overtax computational resources. The number of columns may correspond to the number of receiving antennas M, or, if there are an abundance of antenna, some of the antennas may be neglected and the number of columns may correspond to n+k, where n is the number of sources in a particular set and k is an allowance for interferers, for instance, one or two interferers that need to be distinguished from the true sources plus two or three phantom columns. The number of rows corresponds to over sampling of the signal. A minimum of 2× over sampling is expected, with 6× over sampling considered desirable. For a particular implementation, a simulation of operating conditions using MATLAB or another simulation tool would normally be employed to determine the number of rows. This allows selection of configuration parameters prior to product deployment. Alternatively, a product could be adaptive, applying different parameter sets during an initialization period and selecting among the results.

The method determines singular values by applying SVD to the over sampling of the signals. From the initial coordination phase of reception, the method is aware of the number of sources M to be distinguished and the number of extra antennas/columns available to enhance the spatial separation. From the singular values, the M values corresponding to the sources will be identified. The calculated values of these M singular values will be used to determine whether set membership should be rearranged. Generally, if the singular value for one of the signals is much smaller than the singular value for the others, the source with the relatively small singular value should be shifted to a different set. To illustrate, consider a set of singular values for four signals and six columns. Suppose that the relative strengths of the sources are 10, 9, 8.5 and 7 and that the noise sources are small, such as 0.2 and 0.1. Due to poor spatial separation, power leaks from the sources into the noise coefficients, resulting in singular values of 10, 9, 5, 4, 3, 1. In this example, the sources are identified with the singular values 10, 9, 5, 4. If the range of singular values is considered too broad, then either the source with the value 5 or 4 would be shifted to another set, where it may more readily be distinguished from other set members. If the source corresponding to "4" is shifted from set A to set B, a source in set B may be substituted. Alternatively, if set A is initially constructed with more members than set B, the source corresponding to "4" may be shifted to set B without replacement. These illustrative values are another way of considering spatial separation issues presented in FIGS. 4 and 5.

The process of shifting sources from one set to another may be iterative, because solving an old problem may create a new problem. However, a relatively short convergence time is expected.

Once a connection is established, the method may be extended either by tracking sources or by repeating the SVD analysis. For mobile clients, it is anticipated that spatial separation may change during a connection. It is useful to take into account mobility of sources.

Forms of correlation present alternatives to SVD for analyzing set membership. During the second stage, after preliminary set assignment, cross-correlation used to check set assignment. One way to apply cross-correlation is to make pair-wise comparisons of signals. The signals that are least correlated are easiest to distinguish. If two signals are closely correlated, with a high $R^2$, one of the two is shifted from set A to set B. When pair-wise comparisons are used, as secondary criteria may be applied to determine which of two closely correlated sources should be shifted. One approach is to use the SQI/RSSI values of the two signals to determine the shift. The signal with the SQI/RSSI value closed to the candidate set B could be shifted. Another approach is to take into account cross-correlations with other set members. The signal that has the highest cross-correlation with one or more other set members could be shifted to set B.

An alternative correlation analysis is to correlate expected and received signals, to characterize the received signals. From correlation of expected and received signals, characteristics of the received signal can be described. For instance, height and width of the correlation main lobe, height of side lobes, number of side lobes with a predetermined strength or similar characteristics can be determined. Phase shifting of the signal also may be correlated. Different characteristics can be assigned different weights. One or more signal characteristics can be used as a proxy for spatial separation of signals. Generally, signals with similar characteristics will have less spatial separation than signals that have dissimilar characteristics.

The three embodiments described above offer varying approaches to determining whether sources, assigned preliminarily to a set, can practically be spatially resolved. When the analysis suggests that sources cannot practically be spatially resolved, set membership is rearranged so that the resulting set members can practically be spatially resolved.

This invention includes multiple embodiments. One embodiment is a method of serving clients and a wireless system with m antennas, the clients outnumbering the antennas. This method includes grouping the clients into n–1 or fewer clients and determining for the sets whether members of the sets can practically be spatially resolved using the antennas. The method further includes, for a least one particular set in which at least two set members cannot practically be spatially resolved, changing the members of the particular set and reevaluating whether resulting members of the particular set can practically be spatially resolved. With SVD, for instance, a measure of whether the set members are practically spatially resolved is reflected in the decomposition coefficients. The method further may include serving the clients in the wireless system, grouped into the sets.

One application of the present invention is to serve clients utilizing time division to allocate one or more available channels among the sets of clients and transmitting simultaneously to members of the particular set during a particular time allocation. This application further may include using the same available channels for transmission simultaneously to the members of the particular set.

According to another aspect, grouping uses a signal quality metric. Grouping produces clients that have similar signal quality metrics. Alternatively, grouping uses a received signal strength metric. Then, grouping may produce sets of clients that have similar received signal strength metrics. In combination with either of these aspects, grouping may include counting how many clients are in the sets. These grouping aspects may be applied to any of the embodiments described herein.

One embodiment includes deriving at least approximate singular value decompositions for at least some of the sets. In this embodiment, grouping further may include counting how many clients are in a particular set; then a matrix for the singular value decompositions applied to the particular set includes at least for more columns than a count of how many clients are in the particular set. Alternatively, grouping further may include counting how many clients are in a particular set, estimating an expected number of interference sources, and using a matrix for the singular value decompositions applied to the particular set that includes at least two more columns than a count of how many clients are in the particular set plus the expected number of interference sources. In any of the singular value decomposition embodiments, sampling of signals received at the antennas for derivation of the singular value decompositions may involve at least 6x over sampling.

Another embodiment includes cross-correlating received signals corresponding to members of the sets. This embodiment further may include determining whether the correlation between any two members of the sets exceeds a predetermined threshold.

Yet another embodiment includes comparing received signals and expected signals, characterizing the received signals, and evaluating variations in the characterized signals. This embodiment further may include determining whether the characteristics of any two members of the sets indicate likely difficulty in applying spatial separation to the two members.

Any of the embodiments and aspects may be enhanced by iteratively changing the members and reevaluating the resulting members. The method may include changing the members and reevaluating the resulting members, repeated until the sets consist of members that can be spatially resolved using the antennas.

Any of the embodiments and aspects may be applied to either a distributed coordination function (DCF) or a point coordination function (PCF).

The methods described above may be recast as devices. One such device serves clients in a wireless network. Includes m signal feeds and logic and resources coupled to the m signal feeds to group the clients into m-1 one or fewer clients, to determine for the sets whether members of the sets can practically be spatially resolved using the signal feeds, and, for a least one particular set in which at least two set members cannot practically be spatially resolved, to change the members of the particular set and reevaluate whether the resulting members of the particular set can practically be spatially resolved.

The embodiments and aspects of the method can be combined in many ways with the device described above. For instance, the logic and resources to determine practicality of spatial resolution may derive at least approximate singular value decompositions for the sets. Alternatively, the logic and resources may derive cross correlations among received signals corresponding to members of the sets. Or, the logic and resources may compare received signals and expected signals, characterize the received signals, and evaluate variations in the received signals.

The methods described above can further the characterized as articles of manufacture, particularly magnetic media impressed with logic to perform the methods described. The method further can be characterized as articles of manufacture, particularly machine-readable signals carrying logic that can be executed to perform the methods described above.

While the present invention is disclosed by reference to the preferred embodiments and examples detailed above, it is understood that these examples are intended in an illustrative rather than in a limiting sense. It is contemplated that modifications and combinations will readily occur to those skilled in the art, which modifications and combinations will be within the spirit of the invention and the scope of the following claims.

I claim:

1. A method of serving clients in a wireless system with m antennas, the clients outnumbering the antennas, the method including:
    grouping the clients into sets of m-1 or fewer clients;
    determining for the sets whether members of the sets can practically be spatially resolved using the antennas;
    for at least one particular set in which at least two set members cannot practically be spatially resolved, changing the members of the particular set and reevaluating whether resulting members of the particular set can practically be spatially resolved; and
    serving the clients in the wireless system, grouped into the sets and transmitting simultaneously to the members of the particular set during a particular time allocation.

2. The method of claim 1, wherein serving the clients further includes:
    utilizing time division to allocate one or more available channels among the sets of clients.

3. The method of claim 2, wherein the transmitting includes using the same available channels for transmission simultaneously to the members of the particular set.

4. The method of claim 1, wherein the grouping uses a signal quality metric.

5. The method of claim 4, wherein the grouping produces sets of the clients that have similar signal quality metrics.

6. The method of claim 1, wherein the grouping uses a received signal strength metric.

7. The method of claim 6, wherein the grouping produces sets of the clients that have similar received signal strength metrics.

8. The method of claim 1, wherein the grouping further includes counting how many clients are in the sets.

9. The method of claim 5, wherein the grouping further includes counting how many clients are in the sets.

10. The method of claim 7, wherein the grouping further includes counting how many clients are in the sets.

11. The method of claim 1, wherein the determining includes deriving at least approximate singular value decompositions (SVDs) for the sets.

12. The method of claim 11, wherein the grouping produces sets of the clients that have similar signal quality metrics.

13. The method of claim 11, wherein the grouping produces sets of the clients that have similar received signal strength metrics.

14. The method of claim 11, wherein:
    the grouping further includes counting how many clients are in a particular set; and
    a matrix for the SVD applied to the particular set includes at least four more columns than the count of how many clients are in the particular set.

15. The method of claim 11, wherein:
    the grouping further includes counting how many clients are in the sets;
    the method further includes estimating an expected number of interference sources; and
    a matrix for the SVD applied to the particular set includes at least two more columns than the count of how many clients are in the particular set plus the expected number of interference sources.

16. The method of claim 11, wherein sampling of signals received at the antennas for derivation of the SVD is at least 2× over sampling.

17. The method of claim 11, wherein sampling of signals received at the antennas for derivation of the SVD is at least 6× over sampling.

18. The method of claim 1, wherein the determining step includes deriving cross-correlations among received signals corresponding to members of the sets.

19. The method of claim 18, wherein the grouping produces sets of the clients that have similar signal quality metrics.

20. The method of claim 18, wherein the grouping produces sets of the clients that have similar received signal strength metrics.

21. The method of claim 1, wherein the determining step further includes:
    comparing received signals and expected signals;
    characterizing the received signals; and
    evaluating variations in the characterized signals.

22. The method of claim 21, wherein the grouping produces sets of the clients that have similar signal quality metrics.

23. The method of claim 21, wherein the grouping produces sets of the clients that have similar received signal strength metrics.

24. The method of claim 1, wherein the changing the members and reevaluating the resulting members is repeated iteratively.

25. The method of claim 1, wherein the changing the members and reevaluating the resulting members is repeated until the sets consist of members that can practically be spatially resolved using the antennas.

26. The method of claim 1, wherein grouping the clients includes applying a distributed coordination function (DCF).

27. The method of claim 1, wherein grouping the clients includes applying a point coordination function (PCF).

28. A device that serves clients in a wireless system, including:
   m signal feeds;
   logic and resources coupled to the m signal feeds to
      group the clients into sets of m−1 or fewer clients;
      determine for the sets whether members of the sets can practically be spatially resolved using the signal feeds;
      for at least one particular set in which at least two set members cannot practically be spatially resolved, change the members of the particular set, reevaluate whether resulting members of the particular set can practically be spatially resolved and transmit simultaneously to the members of the particular set during a particular time allocation.

29. The device of claim 28, wherein the logic and resources to determine practicality of spatial resolution derives at least approximate singular value decompositions (SVDs) for the sets.

30. The device of claim 28, wherein the logic and resources to determine practicality of spatial resolution derives cross-correlations among received signals corresponding to members of the sets.

31. The device of claim 28, wherein the logic and resources to determine practicality of spatial resolution
   compares received signals and expected signals;
   characterizes the received signals; and
   evaluates variations in the characterized signals.

* * * * *